United States Patent
Urfalioglu et al.

(10) Patent No.: US 10,212,331 B2
(45) Date of Patent: Feb. 19, 2019

(54) IMAGING DEVICE AND METHOD FOR AUTOMATIC FOCUS IN AN IMAGING DEVICE AS WELL AS A CORRESPONDING COMPUTER PROGRAM

(71) Applicant: Huawei Technologies Co., Ltd., Shenzhen (CN)

(72) Inventors: Onay Urfalioglu, Munich (DE); Giovanni Cordara, Munich (DE)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 15/156,027

(22) Filed: May 16, 2016

(65) Prior Publication Data
US 2016/0261787 A1 Sep. 8, 2016

Related U.S. Application Data

(63) Continuation of application No. PCT/EP2014/055677, filed on Mar. 21, 2014.

(51) Int. Cl.
H04N 5/232 (2006.01)
H04N 5/225 (2006.01)
G02B 7/36 (2006.01)

(52) U.S. Cl.
CPC ........... H04N 5/23212 (2013.01); G02B 7/36 (2013.01); H04N 5/2258 (2013.01); H04N 5/23216 (2013.01)

(58) Field of Classification Search
CPC ............. H04N 5/2258; H04N 5/23216; H04N 5/23212; G02B 7/36
See application file for complete search history.

(56) References Cited

U.S. PATENT DOCUMENTS

2003/0156216 A1* 8/2003 Nonaka ............. H04N 5/23212
 348/345
2003/0160886 A1 8/2003 Misawa et al.
(Continued)

FOREIGN PATENT DOCUMENTS

CN 1677155 A 10/2005
CN 1790095 A 6/2006
(Continued)

OTHER PUBLICATIONS

Firestone, L. et al. "Comparison of Autofocus Methods for Automated Microscopy," Cytometry, Jan. 1991, pp. 195-206, vol. 12, Issue. 3.
(Continued)

Primary Examiner — Twyler L Haskins
Assistant Examiner — Carramah J Quiett
(74) Attorney, Agent, or Firm — Slater Matsil, LLP

(57) ABSTRACT

An imaging device, and a method for automatic focus in said imaging device is disclosed. The imaging device comprises a first imaging system with a first lens system, a second imaging system with a second lens system, and an autofocus controller. The imaging device and the method are respectively able to perform a step by step autofocus search with the first lens system and the second lens system on the basis of a search parameter. Thereby, the autofocus controller obtains a result of an objective function for each of the first lens system and the second lens system after each autofocus search step, and updates the search parameter depending on the obtained results of the objective function for each of the first lens system and the second lens system.

18 Claims, 4 Drawing Sheets

(56) References Cited

U.S. PATENT DOCUMENTS

| | | | |
|---|---|---|---|
| 2004/0263674 | A1 | 12/2004 | Koreki |
| 2005/0168620 | A1 | 8/2005 | Shiraishi |
| 2005/0219718 | A1 | 10/2005 | Umezu et al. |
| 2007/0103577 | A1 | 5/2007 | Misawa et al. |
| 2009/0041444 | A1 | 2/2009 | Nakai et al. |
| 2011/0075018 | A1 | 3/2011 | Kohama |
| 2011/0234640 | A1* | 9/2011 | Ishida ............ G06K 9/00221 345/671 |
| 2011/0242346 | A1* | 10/2011 | Ego ................ H04N 5/2251 348/222.1 |
| 2011/0267510 | A1* | 11/2011 | Malone .......... H01L 27/14625 348/262 |
| 2012/0140337 | A1 | 6/2012 | Miyatani et al. |
| 2012/0154647 | A1* | 6/2012 | Endo ............. H04N 5/23212 348/262 |
| 2013/0028582 | A1 | 1/2013 | Batur et al. |
| 2013/0120641 | A1 | 5/2013 | Nagaoka |
| 2013/0258044 | A1 | 10/2013 | Betts-Lacroix |
| 2015/0055010 | A1* | 2/2015 | Eguchi ............. G03B 13/36 348/349 |
| 2015/0092023 | A1* | 4/2015 | Asakura ............ G03B 35/08 348/49 |

FOREIGN PATENT DOCUMENTS

| | | |
|---|---|---|
| CN | 101112079 A | 1/2008 |
| CN | 101266390 A | 9/2008 |
| CN | 101510041 A | 8/2009 |
| CN | 102540428 A | 7/2012 |
| CN | 103327245 A | 9/2013 |
| JP | 2004207774 A | 7/2004 |
| JP | 2005037898 A | 2/2005 |
| JP | 2005202064 A | 7/2005 |
| JP | 2013030962 A | 2/2013 |
| WO | 2011120645 A1 | 10/2011 |

OTHER PUBLICATIONS

Liu, X.Y. et al. "Dynamic Evaluation of Autofocusing for Automated Microscopic Analysis of Blood Smear and Pap Smear," Journal of Microscopy, Jul. 6, 2006, pp. 15-23, vol. 227, Pt. 1.

* cited by examiner

IMAGING DEVICE AND METHOD FOR AUTOMATIC FOCUS IN AN IMAGING DEVICE AS WELL AS A CORRESPONDING COMPUTER PROGRAM

CROSS-REFERENCE TO RELATED APPLICATIONS

This application is a continuation of International Application No. PCT/EP2014/055677, filed on Mar. 21, 2014, which is hereby incorporated by reference in its entirety.

TECHNICAL FIELD

The embodiment of present application refers to an imaging device as well as a method for automatic focus in an imaging device and the corresponding computer program with a program code for performing the method. Generally, the embodiment of present application relates to the field of computer vision and computational photography, in particular to automatic focusing in an imaging device, such as for example a photo-camera, a mobile phone, a mobile smartphone and the like.

BACKGROUND

In imaging devices with variable focus, very often an autofocus implementation and method is provided to automatically focus the lens system of the imaging system of the imaging device on a specific region of interest in the image, which is also called a salient region of the image. Normally, autofocus implementations in mobile devices are based on sharpness measurements in the salient region of the image.

Autofocus implementations are normally considered to be one of the major drawbacks of cameras in existing mobile devices due to the slow speed. Depending on the quality and resolution of the image sensor, autofocus can require up to several seconds. This rather large amount of time can negatively influence the user experience, as well as the image quality, in particular when the image subject is moving.

Normally, in mobile devices, when the user points the mobile device with the camera to a certain scene, the autofocus implementation is always active by trying to iteratively maximize the sharpness of the salient region within the image. The salient region or region of interest is either automatically determined on the basis of specific parameters in the device, or manually identified by the user. In order to decrease the computational complexity in the iterative process, some implementations compute the sharpness in the salient region on low resolution image frames. Generally, from the user perspective, it is desirable to improve the speed of the autofocus in an imaging device of a mobile device.

Generally, in recent prior art mobile devices, the salient region is automatically detected, for example by some techniques to detect the human face in order to automatically focus on this region, or are selected by the user manually through a specific user interface.

SUMMARY

The object of the embodiment of present application is to provide a concept which reduces the average time needed for autofocus.

The above object is achieved by the solutions provided in the enclosed independent claims. Advantageous implementations are defined in the respective dependent claims.

A first aspect of the embodiment of present application provides an imaging device, comprising a first imaging system with a first lens system, a second imaging system with a second lens system, and an autofocus controller. The autofocus controller is adapted to perform a step by step autofocus search with the first lens system and the second lens system on the basis of the search parameter, wherein said autofocus controller is further adapted to obtain a result of an objective function for each of the first lens system and the second lens system after each autofocus search step and to update the search parameter depending on the obtained results of the objective function for each of the first lens system and the second lens system.

The advantage of the imaging device according to the embodiment of present application over the prior art is the reduced average time needed for an autofocus of the respective lens system in the at least two imaging systems of the imaging device, while still providing a maximum sharpness and/or contrast within the salient region of the image. The term step by step is intended to define an iterative autofocus search, in which each autofocus step is followed by a succeeding autofocus search step until a predetermined abort condition is met.

In the first implementation form of the imaging device according to the first aspect, said autofocus controller is further adapted to initially obtain a result of an objective function for each of the first lens system and the second lens system in a predetermined position in a common initial search range and to store, for each of the first lens system and the second lens system separately, the respective obtained result of the objective function as a stored best result. Hereby, the results from both lens systems are used in the autofocus search, whereby the respectively best result is stored and further used so that the accuracy is enhanced.

In a second implementation form of the imaging device of the first implementation form of the first aspect, said autofocus controller is further adapted to store, for each of the first lens system and second lens system separately, the respective best result of the obtained objective function and to compare after each of autofocus search step, the respective obtained result of the objective function with the stored best result for each of the first lens system and second lens system, wherein the autofocus controller is further adapted to update the search parameter depending on the result of said comparisons. Hereby, the accuracy of the autofocus search is further enhanced and sped up.

In a third implementation form of the imaging device according to the second implementation form of the first aspect, said autofocus controller is further adapted to update the search parameter if said result of the comparison yields that for one of the first lens system or the second lens system the obtained result of the objective function is deteriorating in comparison with the stored best result for this lens system. Hereby, the autofocus search is further accelerated.

In a fourth implementation form of the imaging device according to the third implementation form of the first aspect, the search parameter is a common search range of said autofocus search, wherein said autofocus controller is further adapted to, when updating the search parameter, set a new search range, which is smaller than a respective previous search range if said comparison yields for one of the first lens system and the second lens system that the obtained result of the objective function is deteriorating. Hereby, the search accuracy and speed is further enhanced.

In a fifth implementation form of the imaging device according to the fourth implementation form of the first aspect, said autofocus controller is further adapted to determine a position of the first lens system or the second lens system, at which the obtained result of the objective function for this lens system is deteriorating as a new boundary of the new search range. This further enhances the accuracy and the speed of the autofocus search.

In a sixth implementation form of the imaging device according to the fifth implementation form of the first aspect, said autofocus controller is further adapted to inverse the moving direction during the step-by-step autofocus search of the lens system at which the obtained result of the objective function is deteriorating. This further enhances the speed of the autofocus search.

In a seventh implementation form of the imaging device according to one of the fourth, fifth or sixth implementation forms of the first aspect, said autofocus controller is further adapted to determine a step width of said autofocus search of each of said first lens system and second lens system on the basis of said new search range. Hereby, the accuracy of the autofocus search is further enhanced.

In an eighth implementation form of the imaging device according to the seventh implementation form of the first aspect, said autofocus controller is further adapted to determine said step width using a constant which is valid for the entire autofocus search based on a division of (e.g. by dividing) the length value of the new search range by said constant value. This further enhances the accuracy of the autofocus search in a simple way.

In a ninth implementation form of the imaging device according to one of the third to eighth implementation forms of the first aspect, said autofocus controller is further adapted to stop the autofocus search of the first lens system or the second lens system, when after setting the new search range, the respective lens system is positioned outside the new search range. Hereby, system resources are saved since the lens system which does not further participate in the autofocus search is not further moved, so that for example battery power can be saved.

In a tenth implementation form of the imaging device according to one of the third to eighth implementation forms of the first aspect, said autofocus controller is further adapted to move the first lens system or the second lens system into the new search range, when after setting the new search range, the respective lens system is positioned outside the new search range. Hereby, the accuracy of the autofocus search can be further enhanced.

In an eleventh implementation form of the imaging device according to one of the first to tenth implementation forms of the first aspect, said autofocus controller is further adapted to terminate said autofocus search if a predetermined criteria is met. This ensures that the general speed of the autofocus search remains within a reasonable time frame.

In a twelfth implementation form of the imaging device according to the eleventh implementation form of the first aspect, said criteria is one or more of the new search range falling under a preset threshold, the number of autofocus steps reaching a preset number or the obtained result of the objective function not showing a significant change in relation to the stored best result. In the present application it shall be understood that the obtained result of the objective function does show not a significant change in relation to the stored best result anymore, when the obtained result of the objective function does not vary more than ±10%, ±5%, ±1% or ±0.1% from the stored best result. This ensures a reliable and good result of the autofocus search in a reasonable, i.e. short time frame.

In a thirteenth implementation form of the imaging device according to the first aspect as such or according to one of the first to twelfth implementation forms of the first aspect, the imaging device further comprises a third imaging system with a third lens system, wherein the autofocus controller is further adapted to perform a step-by-step autofocus search with the third lens system on the basis of the search parameter, wherein said autofocus controller is further adapted to obtain a result of an objective function for the third lens system after each autofocus search step and to update the search parameter depending on the obtained results of the objective function of each of the first lens system, the second lens system and the third lens system. This ensures a fast and reliable autofocus search in imaging devices with more than two lens systems.

A second aspect of the embodiment of present application provides a method for automatic focus in an imaging device with a first imaging system with a first lens system and a second imaging system with a second lens system. The method comprises performing a step-by-step autofocus search with the first lens system and the second lens system on the basis of a search parameter, said performing comprising obtaining a result of an objective function for each of the first and the second lens system after each autofocus search step and updating the search parameter depending on the obtained results of the objective function for each of the first lens system and the second lens system. It has to be noted that the method of the second aspect of the embodiment of present application is specifically suited for an automatic focus in an imaging device according to the first aspect of the embodiment of present application and its various implementations as defined above.

In a first implementation form of the method of the second aspect, said performing step comprises an initial step of obtaining a result of an objective function for each of the first lens system and the second lens system in a predetermined position in a common initial search range and the step of storing, for each of the first lens system and the second lens system separately, the respective result of the obtained objective function as a stored best result.

In a second implementation form of the method according to the first implementation form of the second aspect, the method further comprises the steps of storing, for each of the first lens system and the second lens system separately, the respective best result of the obtained objective function and comparing, after each autofocus search step, the respective obtained result of the objective function with the stored best result for each of the first lens system and the second lens system, wherein said step of updating the search parameter is performed depending on the result of said comparing step.

In a third implementation form of the method according to the second implementation form of the second aspect, said step of updating the search parameter is performed if said result of the comparison yields that, for one of the first lens system and the second lens system, the obtained result of the objective function is deteriorating in comparison with the stored best result for this lens system.

In a fourth implementation form of the method according to the third implementation form of the second aspect, the search parameter is a common search range of said autofocus search, and said step of updating the search parameter comprises a step of setting a new search range, which is smaller than a respective previous search range, if said comparison yields, for one of the first lens system and the second lens system, that the obtained result of the objective function is deteriorating.

In a fifth implementation form of the method according to the fourth implementation form of the second aspect, in said setting step, a position of the first lens system or the second lens system, at which the obtained result of the objective function for this lens system is deteriorating, is determined as a new boundary of the new search range.

In a sixth implementation form of the method according to the fifth implementation form of the second aspect, a moving direction during the step-by-step autofocus search of the lens system, at which the obtained result of the objective function is deteriorating, is inversed.

In a seventh implementation form of the method according to one of the fourth, fifth or sixth implementation form of the second aspect, a step width of said autofocus search of each of said first lens system and second lens system is determined on the basis of said new search range.

In an eighth implementation form of the method according to the seventh implementation form of the second aspect, said step width is determined using a constant which is valid for the entire autofocus search based on a division of (e.g. by dividing) the length value of the new search range of said constant value.

In a ninth implementation form of the method according to one of the third to eighth implementations of the second aspect, the autofocus search of the first lens system or the second lens system is stopped when, after setting the new search range, the respective lens system is positioned outside the new search range.

In a tenth implementation form of the method according to one of the third to eighth implementation forms of the second aspect, the first lens system or the second lens system is moved into the new search range, when after setting the new search range, the respective lens system is positioned outside the new search range.

In an eleventh implementation form of the method according to one of the first to tenth implementation forms of the second aspect, the autofocus search is terminated if a predetermined criteria is met.

In a twelfth implementation form of the method according to the eleventh implementation form of the second aspect, said criteria is one or more of the new search range falling under a preset threshold, the number of autofocus steps reaching a preset number or the obtained result of the objective function not showing a significant change in relation to the stored best result.

In a thirteenth implementation form of the method according to the second aspect as such or according to one of the first to twelfth implementation forms of the second aspect, the imagining device further comprises a third imaging system with a third lens system, wherein the step-by-step autofocus search is additionally performed with the third lens system on the basis of the search parameter, wherein a result of an objective function for the third lens system is obtained after each autofocus search step and the search parameter is updated depending on the obtained results of the objective function of each of the first lens system, the second lens system and the third lens system.

A third aspect of the embodiment of present application provides a computer program with a program code for performing the method according to the second aspect of the embodiment of present application as well as any one of the implementation forms of the second aspect of the invention, when the computer program runs on a computer.

The above described first, second and third aspects of the embodiment of present application solve the above described object in an advantageous way. Further advantageous but optional implementations are defined in the various above described implementation forms. The embodiment of present application specifically provides a technical frame work and a technical solution enabling to reduce or even minimize the average time needed for reaching an autofocus position in an imaging device comprising at least a first imaging system with a first lens system and a second imaging system with a second lens system. It has to be understood, that the embodiment of present application is not limited to an imaging device with a first and a second imaging system with a first and a second lens system, respectively, but can be implemented for an imaging device with a first, second and third imaging system with a first, second and third lens system, respectively, or even with further additional imaging system with respective lens systems. Further, the embodiment of present application can be applied to imaging implementations in which only a single image is obtained by one of the imaging systems, but also to solutions in which two or more images are obtained, each image being obtained from one of the imaging systems. Specific advantages of the embodiment of present application include that the two (or more) lens systems of the imaging device can be moved simultaneously and independently during the autofocus search while being controlled by a single autofocus controller in order to optimize the objective function in order to find the most sharp (or more contrasted) lens positions, thus reducing or even minimizing the average autofocus time. Normally, the average autofocus time depends on two main features that are variable according to the software and hardware of the imaging device, namely the time needed to compute the objective function and the distance to be covered by the moving lens systems during the autofocus search. The embodiment of present application allows taking into consideration both fractures in order to identify the optimal solution for each imaging device configuration. Depending on the respective position of the lens systems, either one of the lens systems will convert to the in-focus position or both (or more) lens systems will jointly converse to the same in-focus-position. Since both (or more) lens systems are involved jointly in the autofocus search process, the average time needed to find the optimal in-focus position is reduced.

One of the advantages of the embodiment of present application is the joint coordinated control of the first lens system and the second lens system (as well as additional lens system if present), i. e. the updating of the search parameter depending on the obtained results of the objective function for each of the first lens system and the second lens system (as well as further lens systems if available). Hereby, the result of the objective function for each of the present lens systems, after each autofocus search step, is taken into consideration to update the search parameter and therefore for the next (i. e. following) step of the autofocus search. Hereby, the speed of the autofocus process can be enhanced as compared to conventional systems. An additional advantage is that the first lens system and the second lens system (as well as further potential lens systems) can be moved independently and in different parts of the search range, i. e. in different focus areas.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be full formed by external entities not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Before a detailed description of the embodiments of the present invention is given, some further general remarks for understanding the concept of the embodiment of present application shall be given.

The topic of the present application is an imaging device in or for a mobile device, such as a photo-camera, mobile camera, mobile phone, mobile smartphone or the like, with two more imaging systems, i.e. two or more camera implementations. In such devices, it is possible to simultaneously and independently control the autofocus of each imaging system and each of the cameras in order to speed up the autofocus process.

An autofocus technology in imaging devices according to the embodiment of present application can be implemented, for example, by a small servo motor for moving the lens system relative to the image sensor of the imaging system. For each relative position of the lens system in relation to the image sensor, the pixel intensities within the specified salient region are measured. Hereby, for each relative position of the lens system, an objective function measuring the sharpness on the basis of the detected pixel intensities within the salient region is calculated. Generally, this objective function computes a measurement of the sharpness and/or the contrast within the salient region. Different existing objective functions can be used within embodiments of the present invention, such as functions of the intensity variants, the sum of square gradients or the sum of squared intensities and so forth.

Some examples of objective functions O which can be used in embodiments of the present invention are the sum of the absolute values of the first derivative larger than a predefined threshold θ, $$O = \sum_{Height} \sum_{Width} |i(x+1, y) - i(x, y)|$$

where i(x,y) is the grey level intensity of the pixel at the location (x, y), x and y being the coordinates of the horizontal and vertical axis, respectively, and $|i(x+1,y)-i(x,y)|>\theta$ or the variations among image pixels, $$O = \frac{1}{H \cdot W} \sum_{Height} \sum_{Width} (i(x, y) - \mu)^2$$

where H and W respectively represent the horizontal and vertical resolution in pixels of the salient region, and μ indicates the mean intensity on the salient region, or the auto-correlation of the pixels of the salient regions $$O = \sum_{Height} \sum_{Width} i(x+1, y) \cdot i(x, y) - \sum_{Height} \sum_{Width} i(x+2, y) \cdot i(x, y)$$

However, in the embodiment of present application any objective function O, and not only one of the described above one, can be applied to compute sharpness within the salient region.

In general, the lens position which maximizes the objective function is chosen to be the autofocus result.

Figure 1:
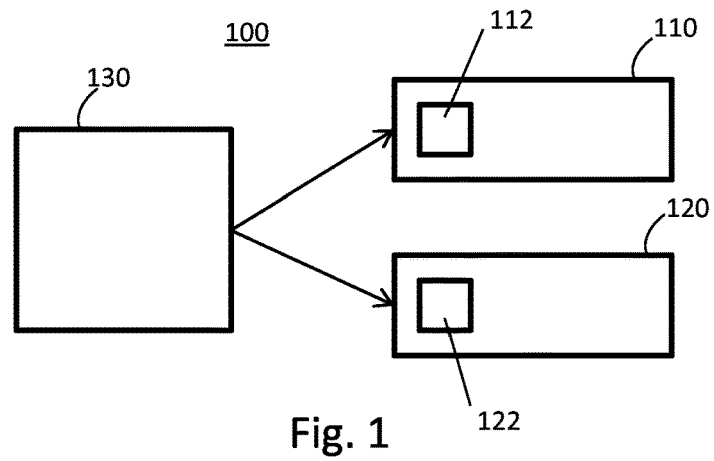
FIG. 1 shows a schematic view of an imaging device according to a first embodiment.

FIG. 1 shows a schematic block diagram of a first embodiment of an imaging device 100. The imaging device 100 comprises a first imaging system 110 with a first lens system 112, a second imaging system 120 with a second lens system 122, and an autofocus controller 130 adapted to perform a step-by-step autofocus search with the first lens system 112 and the second lens system 122 on the bases of a search parameter. The autofocus controller 130 is further adapted to obtain a result of an objective function for each of the first lens system 112 and the second lens system 122 after each autofocus search step and to update the search parameter depending on the obtained results of the objective function for each of the first lens system 112 and the second lens system 122.

The imaging device 100 can be realized as a portable camera, mobile phone, smartphone, tablet, or any other device or apparatus with an imaging function with a first lens system 112 and a second lens system 122.

In further embodiments of the imaging device 100 the imaging device 100 comprises more technical elements than those shown in FIG. 1, such as for example (but not limited to) image sensors, lens system actuators, storage means, processors and so forth.

Generally, the embodiment of present application relates to a quick and efficient autofocus implementation in an imaging device 100. Autofocus is essentially a method or technology to automatically focus a lens system 112, 122 to a specified region of interest (the salient region) in the image. The image is a visual representation of a real world or synthetic scene by an imaging device. Instead of the word image, also the word picture is sometimes used. The autofocus process or implementation involves the optimization of an objective function aiming at maximizing the sharpness and/or the contrast in the specified region of interest. The focusing involves the movement of one or more lenses of the respective lens system 112, 122 to a certain optimized position in relation to the image sensor. This position is called the in-focus lens position. Further, the specified region of interest is sometimes called the salient region, which is the area within an image which depicts the content which is of most interest for the user. During the autofocus search, the sharpness and/or contrast is iteratively measured step-by-step within the salient region, in order to maximize the result of the related objective function. A salient region can be automatically detected or can be manually selected by a user. The objective function is a function to be computed after each autofocus search step for each candidate lens position in order to measure and obtain the contrast and/or sharpness value for the respective lens position. It is to be noted that the objective function to be computed in the frame of the embodiment of present application corresponds and can be one of a conventional objective function. Any suitable objective function can be used which provides a rather fast but reliable result for the image sharpness (and/or contrast) in each autofocus search step for each of the lens systems 112, 122. The sharpness measured and computed by the objective function is proportional to the rate of the average change or average derivative of the image intensity in the salient region: the sharper the image, the larger the average derivative, which is equivalent to the contrast. Thus measuring and calculating the sharpness is equivalent to measuring or calculating the contrast in the salient region. As mentioned, the salient region is the specified region of interest in the captured image. The embodiment of present application applies to digital imaging devices, in which the image is captured by an image sensor in form of an electronic chip consisting of a two dimensional array of pixel elements. A pixel is hereby the smallest addressable image or picture element. A respective electronic chip is placed inside the respective first imaging system 110 and the second imaging system 120. The chip is exposed to light via the first lens system 112 and second lens system 122, respectively, and determines the light intensities for each color and pixel. The resulting array of color values is stored as an image in a respective storage or memory element. The result of the objective function is than calculated using these color values within the salient region. The embodiment of present application applies to a technology in which at least two imaging systems 110, 120 are provided in the imaging device 100. Each of the imaging systems 110, 120 captures a respective different view of the same scene simultaneously, so that a pair of images is stored. Or in other words, the two imaging systems can have an overlapping field of view. The salient regions can be captured by both of the imaging systems 110, 120 at the same time. An objective function is then calculated for each lens position of the first and second lens system 112, 122, respectively separately. In other words, for the first lens system 112, a result of the objective function is obtained for each autofocus step, and for the second lens system 122, a result of the objective function is obtained after each autofocus step. Both results of the objective function are then commonly and simultaneously used by the autofocus controller 130 to update the (common) search parameter.

Figure 2:
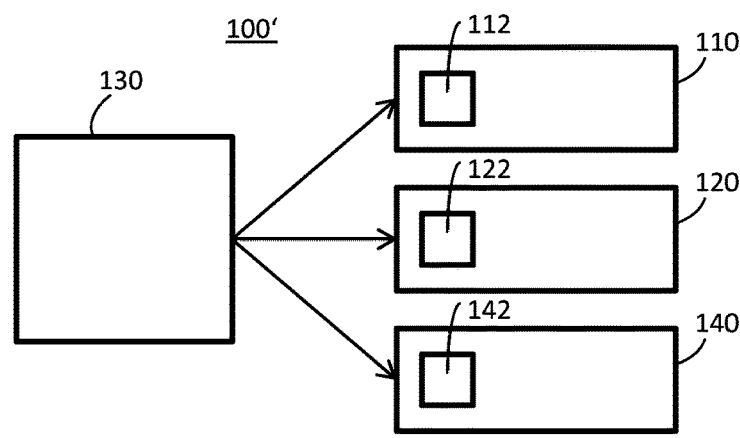
FIG. 2 shows a schematic view of an imaging device according to a second embodiment.

It has to be noted that the embodiment of present application is not limited to an imaging device with a first imaging system 110 and a second imaging system 120, but can refer to an imaging device with more than two imaging system. An example for a further embodiment of an imaging device 100' is shown in FIG. 2. The imaging device 100' comprises the first imaging system 110, the second imaging system 120 and a third imaging system 140. The third imaging system 140 comprises a third lens system 142. The first imaging system 110 and the second imaging system 120 correspond to the ones shown for and explained in relation to the imaging device 100 of the embodiment shown in FIG. 1. All corresponding explanations apply identically. In addition hereto, the imaging device 100' shown in FIG. 2 comprises the third imaging system 140 with the third lens system 142. The functionalities and characteristics of the third imaging system 140 correspond to the ones of the first and the second imaging system 110, 120, respectively. All features and characteristics in relation to the first lens system 112 and the second lens system 122 identically apply to the third lens system 142 of the third imaging system 140. In the case of the imaging device 100' of FIG. 2, a result of the objective function in each autofocus search step is obtained separately for each of the first, second and third imaging system 110, 120, 140, and the search parameter of the autofocus search is updated taking into consideration and depending on each of these three results of the objective functions in the same way as explained in relation to the imaging device 100 of FIG. 1.

Figure 3:
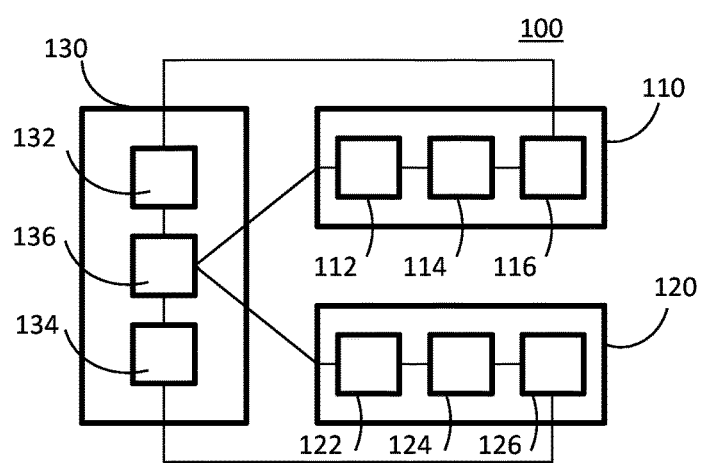
FIG. 3 shows a more detailed implementation of the imaging device according to the first embodiment as shown in FIG. 1.

FIG. 3 shows a more detailed view of the imaging device 100 of the embodiment of FIG. 1. The first imaging system 110 of the imaging device 100 comprises the mentioned first lens system 112 as well as a first lens driver 114, which is controlled by the autofocus controller 130 in order to change the position of the one or more movable lenses of the first lens system 112. The first imaging system 110 further comprises a first imaging sensor 116 which captures the image provided by the first lens system 112. The image data captured by the first imaging sensor 116 are then supplied to the autofocus controller 130. More specifically, a first sharpness measure block 132 of the autofocus controller 130 is adapted to calculate and output the result of the objective function for the salient region of the image provided by the first image sensor 116 and provides this result to a processing element 136 of the autofocus controller 130. Similarly, the second imaging system 120 comprises a second lens driver 124 which, under the control of the autofocus controller 130 changes the position of the one or more movable lenses of the second lens system 122. The second imaging system 120 further comprises a second image sensor 126 which captures the image provided by the second lens system 122 and supplies the image data to a second sharpness measure block 134 of the autofocus controller 130. The second sharpness measure block 134 calculates the result of the objective function in the salient region and supplies the result to the processing element 136 of the autofocus controller 130. The functionalities and features of the second sharpness measure block 134 are identical to the ones of the first sharpness measure block 132. Similarly, the functionalities and characteristics of the second imaging sensor 126 correspond to the ones of the first imaging sensor 116. The same is true for the functionalities and features of the second lens driver 124 in relation to the first lens driver 114. It has to be noted that the sharpness measure blocks 132, 134 could be part of the processing element 136 of the autofocus controller 130 or, as shown, be embodied in separate elements. In case that the imaging device 100' according to the embodiment of present application comprises a third imaging system 140 or even more imaging systems, these would be constructed in the same way as the imaging systems 110 and 120 as shown in FIG. 3. In this case, the autofocus controller 130 would then comprise the corresponding third or further sharpness measure blocks and the respectively necessary functionalities.

The whole image capturing process in the imaging device 100 in the embodiment of present application is started by first determining a salient region in an initial step. This may be implemented by any suitable method, including an automatic method for example by face detection done in parallel for all of the imaging systems 110, 120, 140, or manually by a corresponding user input. In the automatic case, the salient regions for each of the imaging systems 110, 120 and so forth are e.g. validated by a simple disparity estimation check performed in the autofocus controller 130 in order to make sure that they cover the same scene content in all views. In the manual case, the salient region is first determined for one single view e.g. provided by the first imaging system 110 only. By applying a basic disparity estimation, the salient regions in all other views provided by the second imaging system 120 and eventually by the third imaging system 140 and so forth are determined in the autofocus controller 130. The result of the objective function obtained for each of the salient regions in the first and second sharpness measure blocks 132 and 134, respectively, is then together used to control the position of the at least one movable lens in each of the first and second lens systems 112 and 122, respectively. Thus, the update of each movable lens position in each autofocus search step is based on the joined results of the objective function obtained in each previous autofocus search step for each of the imaging system 110, 120. The autofocus controller, more specifically the processing element 136, is further configured to, after each autofocus search step, control the number of iterations of the autofocus search steps by checking for an abort condition after each iteration. The abort condition is satisfied in case that at least one of the lens systems 112, 122 (and eventually 142) converges to the in-focus position.

Figure 4:
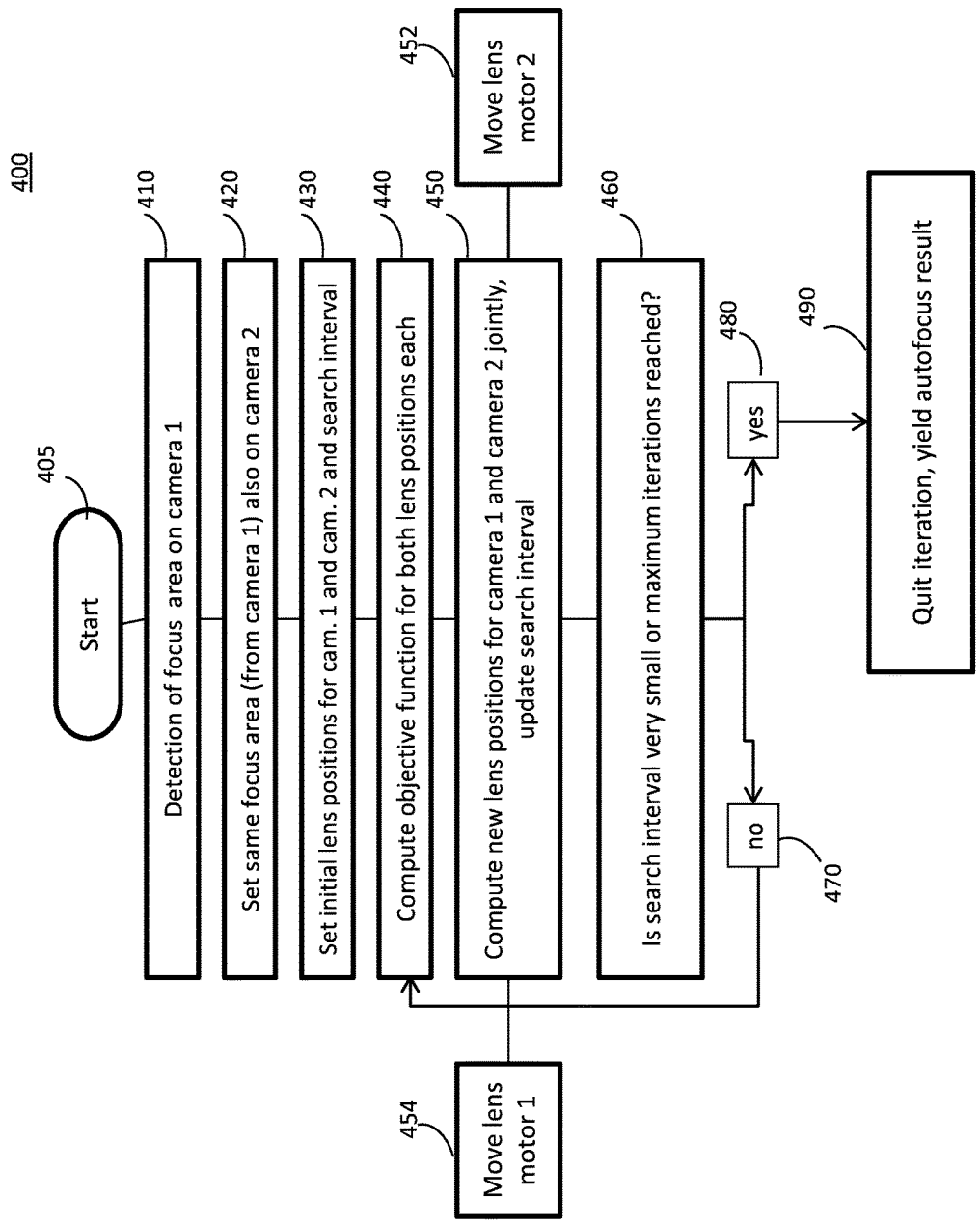
FIG. 4 shows a flow chart of a method for automatic focus in an imaging device.

FIG. 4 shows a flow chart of a method 400 for automatic focus in an imaging device 100, 100' according to the embodiment of present application. After a start step 405, which is for example the power on of an imaging device 100, 100' of the embodiment of present application or the start of a camera application of the imaging device 100, 100', the salient region of the image is detected for the first imaging system 100 using any available automatic or manual method as explained above. This detecting step 410 is performed in and by the autofocus controller 130. Then, the same salient region is chosen for the second imaging system 120 in the succeeding step 420. This step 420 is also performed in and by the autofocus controller 130. In order to find the corresponding salient region for the second imaging system 120, any disparity estimation method can be used, for example simple block matching. In the succeeding step 430 performed by the autofocus controller 130 in cooperation with the corresponding lens drivers 114, 124, the initial lens positions are set for the movable lenses of the first lens system 112 and the second lens system 114 of the first and second imaging systems 110 and 120, respectively. Hereby, it is to be noted that the movable lenses of both lens systems 112, 122 share the same search range, i. e. the search range of each movable lens is the same as the total search range. The search range is the movable range of each of the movable lenses in the first and second lens systems 112 and 122, respectively. If, for example, the total normalized search range is set between 0 and 1, the initial position of the movable lens in the first lens system 112 could be at 0.25 and the initial position of the movable lens of the second lens system 122 could for example be at 0.75. Then, in the next step 440, the result of the objective function is calculated for each of the first imaging system 110 and the second imaging system 120 separately. Hereby, the pixels in the respective salient regions are used and the result of the objective function is calculated by the first sharpness measure block 132 for the first imaging system 110 and the result of the objective function for the second imaging system 120 is calculated by the second sharpness measure block 134. Then, in the autofocus controller 130, for example in the processing element 136, the next step 450 is performed, namely, the computation of the respective new lens position for each of the first and the second lens system 112, 122 is calculated using the results of the objective function calculation supplied by each of the first and the second sharpness measure block 132, 134.

Hereby, any conventional convex objective function calculation can be used, such as for example the examples of objective functions O as described before, or any other suitable convex objective function calculation, which enables the computation of the sharpness in the salient region. The autofocus controller 130 then controls the lens drivers 114, 124 to move the movable lenses respectively to the new lens positions in the first lens system 112 and the second lens system 122. This is reflected in the flow chart of FIG. 4 by step 452 and 454 which visualize the moving of the lenses in the first and the second lens system 112, 122, respectively. Thereafter, in the succeeding step 460 performed by the autofocus controller 130, for example in the processing element 136, it is checked if a preset abort criterion is reached. The preset abort criterion could for example be when a maximum number of iterations of the autofocus search steps is reached, or when the search interval has become very small in relation to the entire initial interval range, or if the results of the objective functions do not significantly change anymore. For example, the autofocus search can be aborted when a maximum number of for example 30 iterations has been reached. Alternatively, if the updated search interval length has been become very small as compared to the initial search interval length, for example 10% of the initial search interval length or 1% of the initial search interval length, the autofocus search is aborted. If the abort criterion is reached, a corresponding decision is made in step 480 and then the autofocus search is aborted in step 490 and the result of the autofocus search is obtained in step 490. These steps are performed in the autofocus controller 130, for example in the processing element 136. If the abort criterion is not reached in step 460, a corresponding determination is made in step 470 and the process goes back to 440 to compute the result of the objective function for the first and the second lens system 112, 122, for the respectively newly determined lens positions.

Figure 5:
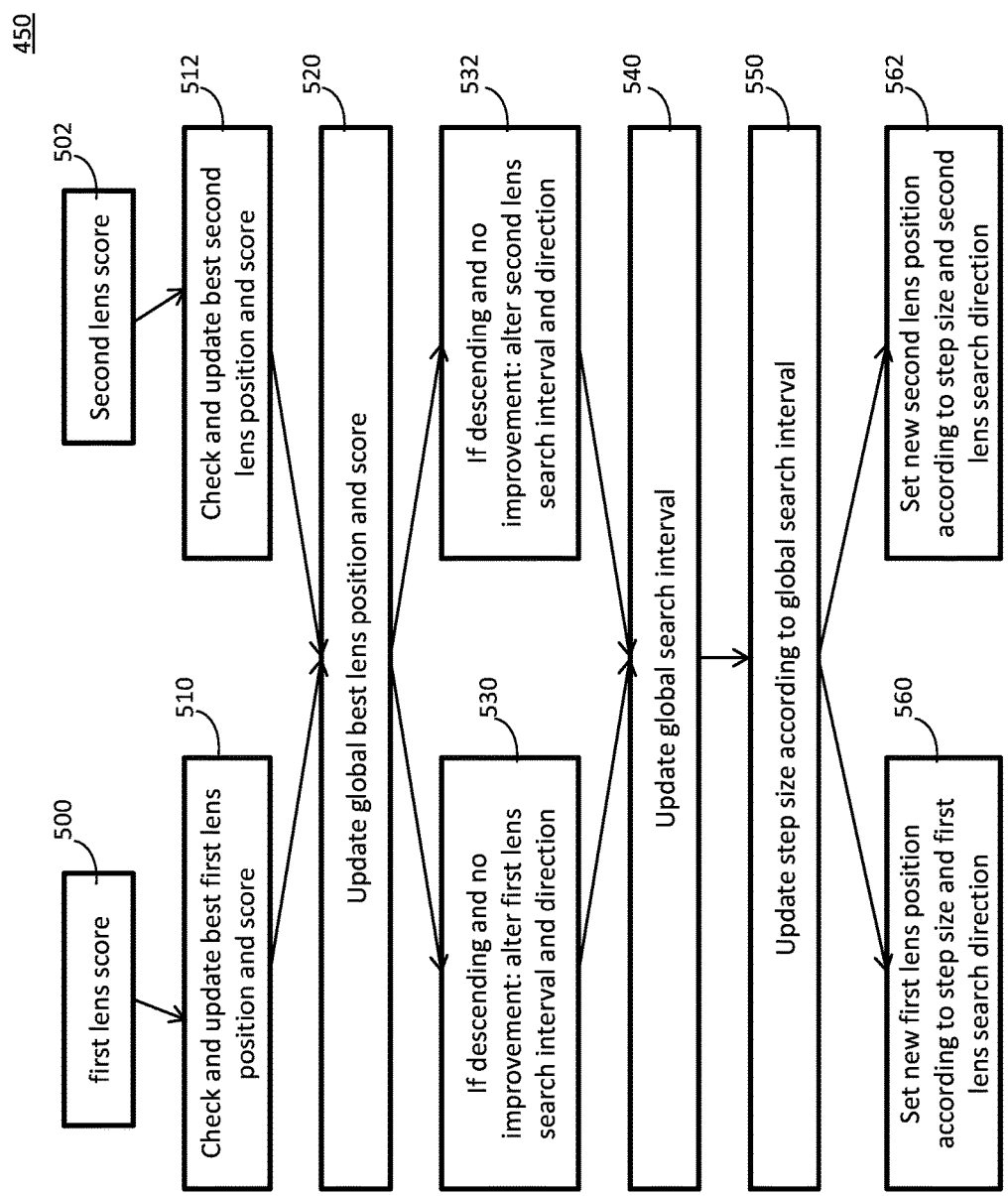
FIG. 5 shows a flow chart of a specific implementation of the step of computing the new lens positions of the method shown in FIG. 4.

FIG. 5 shows a schematic flow chart of an embodiment of a detailed implementation of step 450 performed in the autofocus controller 130 of the imaging device 100, 100' of the embodiment of present application.

As an input to the step 450, the result 500 of the objective function of the first lens system 112 and the result of 502 of the objective function of the second lens system 122 as calculated in step 440 of the method 400 are used.

Then, in the respectively succeeding steps 510 and 512, the results of the objective functions for the lens positions are stored as the best lens positions in a memory or storage together with the respective result of the objective functions. It has to be noted, as visualized in FIG. 5, that the best lens position and corresponding result of the objective function is stored separately for each of the first lens system 112 and the second lens system 122. The best lens position is hereby for example the current position of the movable lens.

It has to be noted that the flow chart and the steps performed by the autofocus controller 130 as shown in FIG. 5 are performed repetitively after each autofocus search step correspondingly, in the initial step, the result of the objective functions obtained for the first and the second imaging system 110 and 120, respectively, in steps 500 and 502, respectively are the results of the initial lens positions. After the first autofocus search step, the results of the objective functions obtained in step 500 and 502 are the ones obtained after the lens positions were changed. In this case, in step 510 and 512, the result of the obtained objective functions for the first and second imaging systems 110 and 120, respectively are compared to the previously stored best result for each of the first and the second imaging systems 110 and 120. If the new result of the objective function obtained for each of the first and second imaging systems 110 and 120, respectively, is individually better than the previous stored best result, the best result is updated. This is done for each of the first and second imaging systems 110 and 120 individually. In step 520, the two best results of the first and the second imaging systems 110 and 120, respectively are then compared and the better result is then stored as the global best result for both imaging system 110 and 120. This global best result is then stored together with the corresponding lens position. Hereby, the updated lens position may simply be the current position of the lens plus the current step size. The step size is the step size of the autofocus search step, which can be positive or negative if the starting position is considered to be "0". If, in the new iteration, there is no change in the search direction, the step size is always positive, otherwise, it is negative. If one of the first and second lens systems 112 and 122, respectively, yields decreasing results of the objective functions, this means that the optimal focus position has been passed. In this case, which is detected in the step 530 and 532 for the first lens system 112 and the second lens system 122 individually, the direction of the autofocus search for the lens system which yields the decreasing results is changed and the lens is moved into the opposite direction for the succeeding of the autofocus search steps. If, in step 530 and/or 532, it is determined that there is still an improvement in the results of the respective objective function, the lens search direction is not changed. However, if the lens direction is changed for one or both of the lens system 112 and 122, a new search range is determined.

The updated search parameter thus is the common search range of the autofocus search performed with each of the first and second lens systems 112, 122. After a change of the search direction is determined in one or both of the step 530 and 532, a new search range is determined, which is smaller than the respective previous search range. Hereby, the lens position of the lens system 112, 122, for which the search direction is changed, is taken as the new upper or lower boundary of the new search range. In the next step 540, in which the global search interval is updated, the global search interval is the common search interval used by the first and second lens system 112, 122 simultaneously. However, during this iterative autofocus search process, it can happen that one of the lens positions is suddenly outside of the new search interval, which is due to the fact that the other lens system is very close to the optimal in-focus position. In this case, the lens system being outside the new global search interval maybe discarded for the remaining autofocus iterations, for example in order to save energy, or it can be moved into the new search interval to continue to support the search process. After updating the global search interval in step 540, the step size of the autofocus search is also updated depending and according to the new global search interval and the next step 550. Hereby, the step size is chosen so that the next positions of the movable lenses of the first and second lens systems 112, 122 are not outside the new search boundaries. For example, the step size can be determined simply by dividing the respective current search range distance or interval by a constant value. This constant value can be always the same during the entire autofocus iterations, so that smaller new search intervals result in smaller search steps, so that the autofocus search is refined successively. After determining the new global search interval and the new step size, as well as the search direction for the movable lenses in the first and the second lens systems 112, 122, the next lens positions for the movable lenses in the first and second lens systems 112, 122 are calculated in the steps 560 and 562.

Then the new positions of the lens systems are adjusted in steps 452, 454 of the method 400. Then, the process goes back to step 440, in which the result of the objective functions for each of the first and the second lens systems 112, 122 for the new lens positions are calculated and the iterative process continues according to the flow charts in FIG. 4 and FIG. 5 until the abort criteria according to step 460 as shown in FIG. 4 is reached.

The computation of the step sizes and the search intervals in the autofocus search is chosen and selected in order to minimize the overall autofocus time. In devices where the servo motor moving the lenses is slow (which mostly happens for smartphones), the average covered lens distance of the moving lenses of the first and second lens systems 112, 122 during the optimization process is minimized, at the expense of a larger number of iterations. These parameters should be adjusted to find an optimal tradeoff between the covered lens distance and the number of iterations. As an example, increasing the step size general leads to a larger covered distance, but at the same time decreases the requirement number of iterations.

Figure 6:
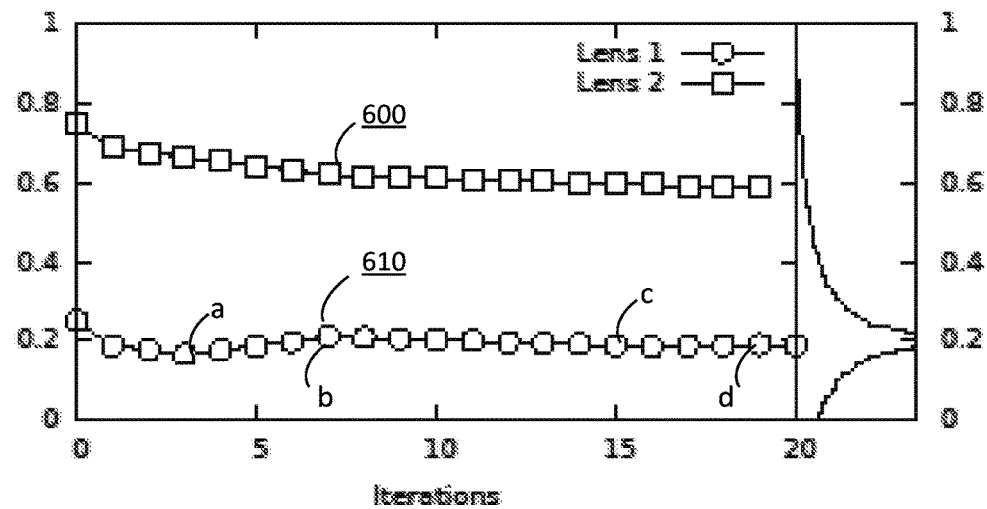
FIG. 6 shows an example diagram of an autofocus search performed in an imaging device.
Figure 7:
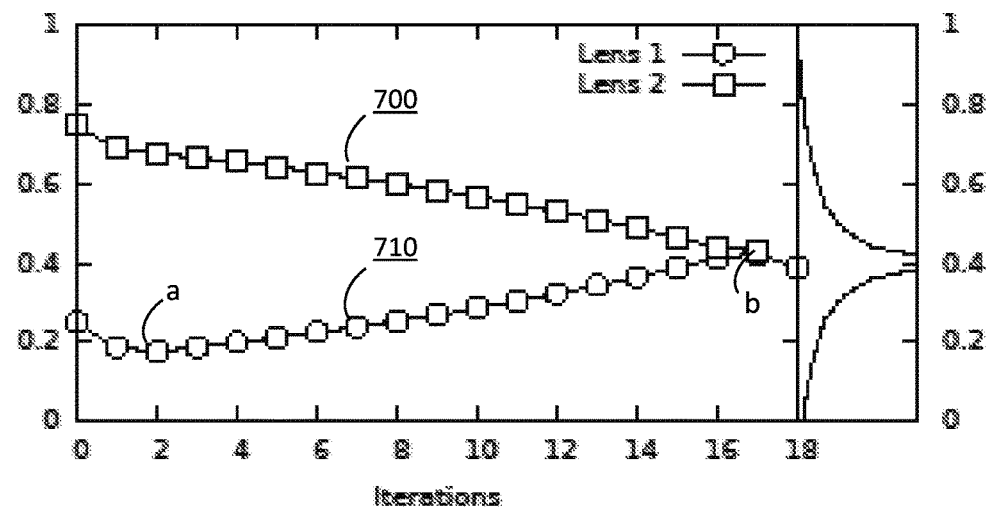
FIG. 7 shows a further exemplary diagram of an autofocus search performed in an imaging device.

FIGS. 6 and 7 show exemplary diagrams of autofocus step iterations performed by the first lens system 112 and the second lens system 122. The search range is the vertical axis and the number of iterations is the horizontal axis of the shown diagram. In FIG. 6, the line of squares 600 is an example of iteration steps of a movable lens of the first lens system 112 and the line of round dots 610 is an example of iteration steps of a movable lens of the second lens system 122. The first lens system 112 starts on a 0.75 position in the search range and the second lens system 122 starts at a 0.25 position of the search range, as explained in the example above. The first lens system 112 (e.g. in form of a single lens or a plurality of lenses) is moved into the same direction (downwards in the diagram) without any change of direction. On the other hand, the second lens system 122 (e.g. in form of a single lens or a plurality of lenses) changes its search directions a first time after point a, a second time after point b, a third time at point c and a last time at point d of the autofocus iterations. This indicates that the second lens system 122 is the one which converges efficiently towards the in-focus position which yields the best result for the objective function. In the example, this result is reached after 20 iterations as shown in FIG. 6. The first lens system 112 moves, with decreasing step size following from the change of direction of the second lens system 122, towards to the best in-focus position but will never reach it since the second lens system 122 has reached the in-focus position first. In the shown example of FIG. 6, the in-focus position is at position 0.2 of the search range. In point a, a new lower boundary for the search interval is determined. In point b, a new upper boundary for the search interval is found. In point c a new lower boundary for the search interval is found and in point d, a new upper boundary is found. Each time, a new upper or lower boundary for the search interval is found, the global search interval is updated as explained in relation to step 540 of FIG. 5 and the step size is made smaller as explained in relation to step 550 of FIG. 5. Then, in this example, after 20 iterations, the preset abort criterion is reached which is one or more of the new search range falling under a preset threshold, the number of autofocus steps reaching a preset number or the obtained result of the objective function not showing a significant change in relation to the stored best result. Such a significant change could for example be a percentage showing that the result does not change more than 10%, 5%, 1% or 0.1% than the stored best result as an example.

In FIG. 7 a diagram similar to the diagram of FIG. 6 is shown, in which the first lens system (line of squares 700) and the second lens system (line of dots 710) converge towards the same optimum in-focus position 0.4. Hereby, the second lens system 122 changes its search direction in point a and point b, wherein in point a new lower boundary of the search range is determined and in point b a new upper boundary of the search range is determined. In point b, the first lens system 112, although moving in the right direction, results outside of the new search range and thus no longer used in the autofocus search.

The present application has been described in conjunction with various embodiments as examples as well as exemplary implementations. However, other variations can be understood and affected by those skilled in the art and practicing the claimed invention, from the study of the drawings, the disclosure and the independent claims. In the claims as well as in the description, the word, "comprising" does not exclude other elements or steps and the indefinite article ("a" or "an") does not exclude a plurality. A single element or other unit may fulfill the functions of several entities or items were cited in the claims. The mere fact that certain measures are recited in the mutual different dependent claims does not indicate that a combination of these measures cannot be used in an advantageous implementation.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An imaging device, comprising:
a first imaging system comprising a first lens system;
a second imaging system comprising a second lens system;
a third imaging system comprising a third lens system; and
an autofocus controller adapted to:
perform a step by step autofocus search using the first lens system, the second lens system, and the third lens system on the basis of a search parameter;
obtain a result of an objective function for each of the first lens system, the second lens system, and the third lens system after each autofocus search step, the result of the objective function corresponding to a contrast of an image at the respective autofocus search step; and
update the search parameter depending on the obtained results of the objective function for each of the first lens system, the second lens system, and the third lens system.

2. The imaging device according to claim 1, wherein the autofocus controller is further adapted to:
initially obtain a result of an objective function for each of the first lens system and the second lens system in a predetermined position in a common initial search range; and
store, separately for each of the first lens system and second lens system, the respective obtained result of the objective function as a stored best result.

3. The imaging device according to claim 2, wherein the autofocus controller is further adapted to:
store, separately for each of the first lens system, the second lens system, and the third lens system, the respective best result of the obtained objective function;
compare, after each autofocus search step, the respective obtained result of the objective function with the stored best result for each of the first lens system, the second lens system, and the third lens system; and
update the search parameter depending on the result of the comparison.

4. The imaging device according to claim 3, wherein the autofocus controller is further adapted to update the search parameter if the result of the comparison yields that for one of the first lens system, the second lens system, and the third lens system the obtained result of the objective function is deteriorating in comparison with the stored best result for this lens system.

5. The imaging device according to claim 4, wherein the search parameter is a common search range of the autofocus search, and wherein the autofocus controller is further adapted to, in response to updating the search parameter, set a new search range, which is smaller than a respective previous search range, in response to the comparison yielding for one of the first lens system, the second lens system, and the third lens system that the obtained result of the objective function is deteriorating.

6. The imaging device according to claim 5, wherein the autofocus controller is further adapted to determine a position of the first lens system, the second lens system, or the third lens system, at which the obtained result of the objective function for this lens system is deteriorating, as a new boundary of the new search range.

7. The imaging device according to claim 6, wherein the autofocus controller is further adapted to inverse a moving direction during the step by step autofocus search of the lens system at which the obtained result of the objective function is deteriorating.

8. The imaging device according to claim 5, wherein the autofocus controller is further adapted to determine a step width of the autofocus search of each of the first lens system and second lens system on the basis of the new search range.

9. The imaging device according to claim 8, wherein the autofocus controller is further adapted to determine the step width using a constant which is valid for the autofocus search based on a division of a length value of the new search range by the constant.

10. The imaging device according to claim 4, wherein the autofocus controller is further adapted to stop the autofocus search of the first lens system, the second lens system, or the third lens system, in response to, after setting a new search range, the respective lens system being positioned outside the new search range.

11. The imaging device according to claim 4, wherein the autofocus controller is further adapted to move the first lens system, the second lens system, or the third lens system into a new search range, in response to, after setting the new search range, the respective lens system being positioned outside the new search range.

12. The imaging device according to claim 2, wherein the autofocus controller is further adapted to terminate the autofocus search if a predetermined criteria is met.

13. A method in an imaging device, the imaging device comprising a first imaging system with a first lens system, a second imaging system with a second lens system, and a third imaging system with a third lens system, the method comprising:
  performing a step by step autofocus search with the first lens system, the second lens system, and the third lens system on the basis of a search parameter, wherein performing the step by step autofocus search comprises obtaining a result of an objective function for each of the first lens system, the second lens system, and the third lens system after each autofocus search step, the result of the objective function corresponding to a contrast of an image at the respective autofocus search step; and
  updating the search parameter depending on the obtained results of the objective function for each of the first lens system, the second lens system, and the third lens system.

14. The method according to claim 13, further comprising:
  initially obtaining a result of an objective function for each of the first lens system and the second lens system in a predetermined position in a common initial search range; and
  storing, separately for each of the first lens system and second lens system, the respective obtained result of the objective function as a stored best result.

15. The method according to claim 14, further comprising:
  storing, separately for each of the first lens system, the second lens system, and the third lens system, the respective best result of the obtained objective function;
  comparing, after each autofocus search step, the respective obtained result of the objective function with the stored best result for each of the first lens system, the second lens system, and the third lens system; and
  updating the search parameter depending on the result of the comparison.

16. A device, comprising:
  a processor; and
  a computer-readable storage medium storing a program to be executed by the processor, the program including instructions for:
    performing a step by step autofocus search with [a first lens system, a second lens system, and a third lens system on the basis of a search parameter, wherein performing the step by step autofocus search comprises obtaining a result of an objective function for each of the first lens system, the second lens system, and the third lens system after each autofocus search step, the result of the objective function corresponding to a contrast of an image at the respective autofocus search step; and
    updating the search parameter depending on the obtained results of the objective function for each of the first lens system, the second lens system, and the third lens system.

17. The device according to claim 16, wherein the program further includes instructions for:
  initially obtaining a result of an objective function for each of the first lens system and the second lens system in a predetermined position in a common initial search range; and
  storing, separately for each of the first lens system and second lens system, the respective obtained result of the objective function as a stored best result.

18. The device according to claim 17, wherein the program further includes instructions for:
  storing, separately for each of the first lens system, the second lens system, and the third lens system, the respective best result of the obtained objective function;
  comparing, after each autofocus search step, the respective obtained result of the objective function with the stored best result for each of the first lens system, the second lens system, and the third lens system; and
  updating the search parameter depending on the result of the comparison.

* * * * *

UNITED STATES PATENT AND TRADEMARK OFFICE
CERTIFICATE OF CORRECTION

PATENT NO. : 10,212,331 B2
APPLICATION NO. : 15/156027
DATED : February 19, 2019
INVENTOR(S) : Onay Urfalioglu et al.

Page 1 of 1

It is certified that error appears in the above-identified patent and that said Letters Patent is hereby corrected as shown below:

In the Claims

In Column 18, Line 11, Claim 16, delete "with [a first" and insert --with a first--.

Signed and Sealed this
Twenty-sixth Day of March, 2019

Andrei Iancu
*Director of the United States Patent and Trademark Office*